US009077822B2

(12) United States Patent
Hamano

(10) Patent No.: US 9,077,822 B2
(45) Date of Patent: Jul. 7, 2015

(54) IMAGE READING APPARATUS HAVING FLOW-READING MODE IN WHICH SHEET BEING CONVEYED IS READ

(71) Applicant: CANON KABUSHIKI KAISHA, Tokyo (JP)

(72) Inventor: Shigemichi Hamano, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/444,757

(22) Filed: Jul. 28, 2014

(65) Prior Publication Data
US 2015/0055157 A1 Feb. 26, 2015

(30) Foreign Application Priority Data

Aug. 22, 2013 (JP) ................................. 2013-172664

(51) Int. Cl.
*G06K 9/40* (2006.01)
*H04N 1/00* (2006.01)

(52) U.S. Cl.
CPC ......... *H04N 1/00037* (2013.01); *H04N 1/0057* (2013.01); *H04N 1/00909* (2013.01)

(58) Field of Classification Search
USPC ....................................................... 358/1.12
See application file for complete search history.

(56) References Cited

U.S. PATENT DOCUMENTS

| 7,058,236 | B2 | 6/2006 | Ohashi | 382/275 |
| 8,310,733 | B2 | 11/2012 | Sekiguchi et al. | 358/474 |
| 8,432,586 | B2 | 4/2013 | Hamano et al. | 358/505 |
| 2002/0176634 | A1 | 11/2002 | Ohashi | 382/275 |
| 2012/0044541 | A1* | 2/2012 | Kato | 358/448 |
| 2012/0306985 | A1* | 12/2012 | Iguchi et al. | 347/179 |

FOREIGN PATENT DOCUMENTS

JP 4401597 B 1/2010

* cited by examiner

*Primary Examiner* — Qian Yang
(74) *Attorney, Agent, or Firm* — Fitzpatrick, Cella, Harper & Scinto

(57) ABSTRACT

An image reading apparatus may be in a state where a foreign material detection process cannot be completed for all reading position candidates before a sheet arrives at a conveyance roller. In such a state, the image reading apparatus performs the foreign material detection process and a position determination process only on reading position candidates which are part of all reading position candidates. The image reading apparatus determines a reading position candidate with fewest foreign material images from among the reading position candidates for which the foreign material detection process has been completed, as a sheet reading position.

13 Claims, 12 Drawing Sheets

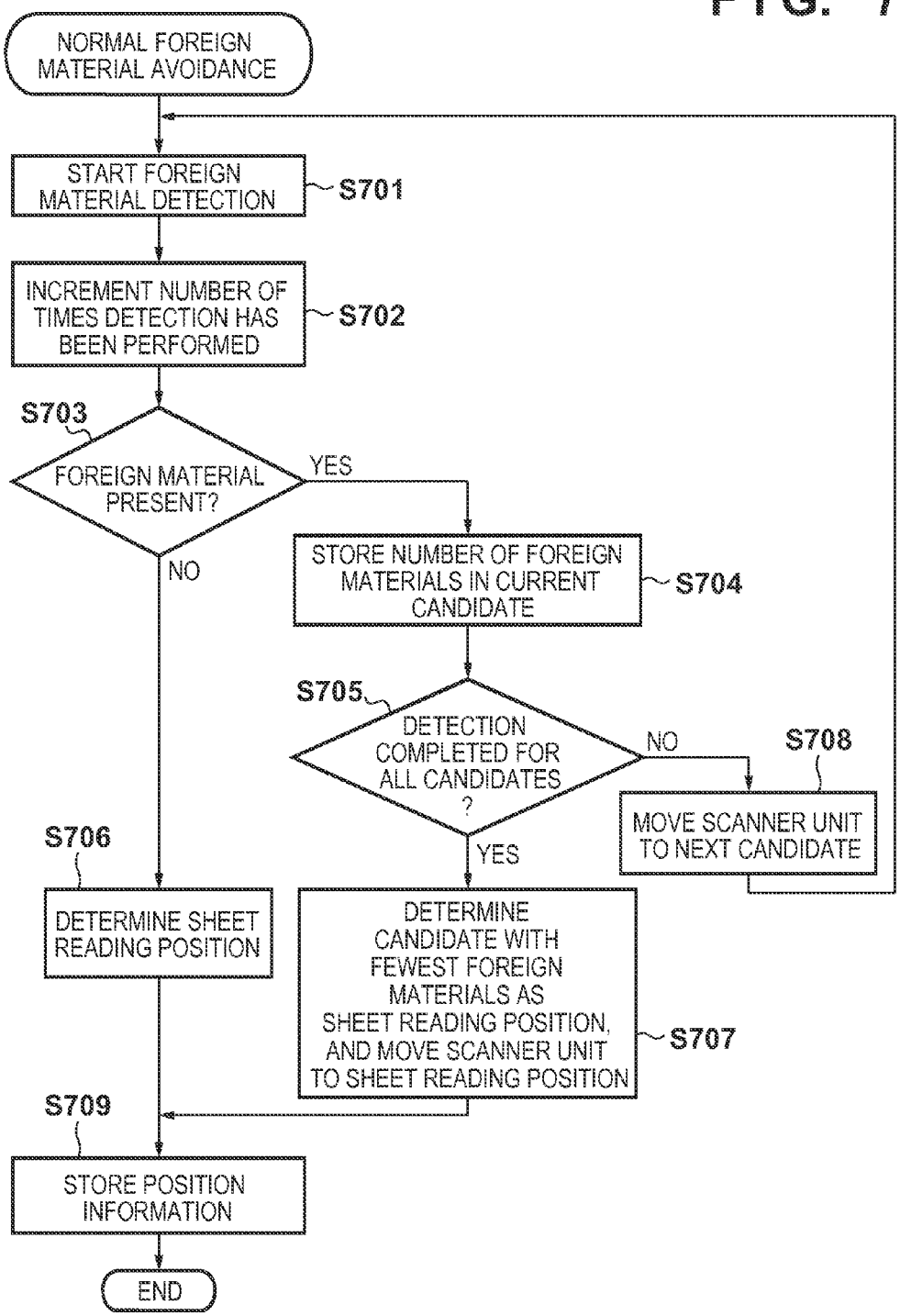

IMAGE READING APPARATUS HAVING FLOW-READING MODE IN WHICH SHEET BEING CONVEYED IS READ

BACKGROUND OF THE INVENTION

1. Field of the Invention

The present invention relates to an image reading apparatus having a flow-reading mode in which a sheet being conveyed is read.

2. Description of the Related Art

Image reading apparatuses have at least one of: a fixed-reading mode in which a sheet placed on a platen is read; and a flow-reading mode in which a sheet conveyed by an auto document feeder (ADF) is read. Especially in the flow-reading mode, if dust or glue of sticky notes and the like (such dust or glue is hereafter referred to as "foreign material") adhering to the platen is read, a linear foreign material image appears in the read image. The U.S. Pat. No. 7,058,236 describes an invention of changing the reading position by moving a mirror table when a foreign material adhering to a platen is detected.

According to the invention in U.S. Pat. No. 7,058,236, whether or not a foreign material is present needs to be checked for each of a plurality of reading position candidates, in a state where no sheet is present on the platen. A certain amount of processing time is required to detect whether or not a foreign material is present for all of the plurality of reading position candidates. Image reading apparatuses in recent years have a sleep mode for saving power. In the sleep mode, whether or not a foreign material adheres to the platen is unclear. Therefore, the need for the foreign material detection process is high upon return from the sleep mode. Upon return from the sleep mode, however, the user wants to perform flow-reading. If the foreign material detection process and the reading position change process take a long time, the time to complete flow-reading increases, and the usability decreases. In particular, conventionally flow-reading cannot be started until the detection process is completed for all of the plurality of reading position candidates, unless a reading position candidate in which no foreign material is detected is found. The detection process thus tends to take long.

SUMMARY OF THE INVENTION

In view of this, the present invention reduces the time required for the foreign material detection process and the reading position determination process than before.

The present invention may provide an image reading apparatus comprising the following elements. A conveyance unit is configured to convey a sheet. A reading unit is configured to read, in a reading position, the sheet being conveyed by the conveyance unit, based on a set reading mode. A foreign material detection unit is configured to detect a position of a foreign material in the reading position, based on image data output from the reading unit while the sheet is not conveyed to the reading position. A moving unit is configured to move the reading unit, to change the reading position. A number determination unit is configured to determine a number of performing a detection process of causing the moving unit to change the reading position and detecting the position of the foreign material, before the reading unit starts reading the sheet based on the set reading mode. A position determination unit is configured to determine the reading position for reading the sheet based on a foreign material detection result of the foreign material detection unit by causing the detection process of causing the moving unit to change the reading position and detecting the position of the foreign material to be performed less than or equal to the number determined by the number determination unit before the reading unit starts reading the sheet.

Further features of the present invention will become apparent from the following description of exemplary embodiments (with reference to the attached drawings).

BRIEF DESCRIPTION OF THE DRAWINGS

FIG. 7 is a flowchart showing an example of normal foreign material avoidance.

DESCRIPTION OF THE EMBODIMENTS

This embodiment assumes a state where a foreign material detection unit cannot complete a detection process for all of a predetermined number of reading position candidates before a sheet arrives at a predetermined position in a conveyance path. An example of this state is a state where flow-reading is performed immediately after an image reading apparatus starts receiving power from a power source or immediately after the image reading apparatus returns from a power saving mode (sleep mode). In this embodiment, a reading position candidate with fewest foreign material images from among a plurality of reading position candidates for which the foreign material detection process has been completed within a predetermined time is determined as a sheet reading position. If a reading position candidate in which no foreign material image is detected is found within the predetermined time, the detection process may be terminated and the candidate may be determined as the sheet reading position.

Thus, in this embodiment, the foreign material detection process is performed only on candidates for which the detection process can be completed within the predetermined time. This reduces the time required for the foreign material detection process and the sheet reading position determination process than before. In other words, the detection process is terminated unless a reading position candidate in which no foreign material image is detected is found within the predetermined time or within a predetermined number of times the detection process is performed. After the flow-reading job is completed, the foreign material detection process may be performed on all reading position candidates as there is enough time.

Figure 1A:
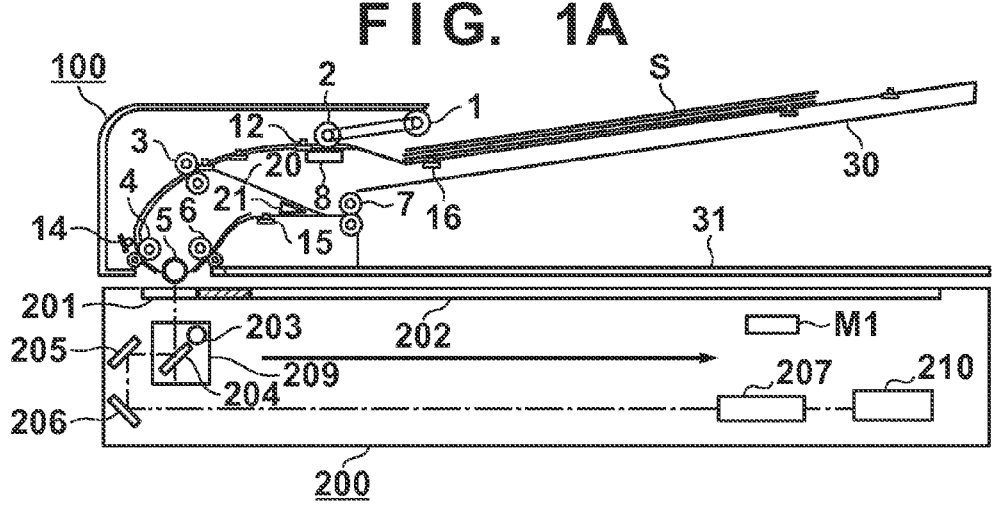
FIGS. 1A to 1C are sectional views of an image reading apparatus.

As shown in FIG. 1A, the image reading apparatus includes an ADF 100 and a reader 200. The image reading apparatus may be a copier or a multifunction peripheral including a printer unit. A sheet tray 30 holds sheets S read in the flow-reading mode. A sheet sensor 16 is a sensor for detecting whether or not a sheet S is present on the sheet tray 30. A feeding roller 1 is a roller for feeding the sheets S from the sheet tray 30 to the conveyance path. A separation roller 2 and a separation pad 8 constitute a separation mechanism for separating each sheet from the set of sheets. A plurality of sheet sensors 12, 14, and 15 are provided in the conveyance path, to detect the leading edge or trailing edge of the sheet S. A resist roller 3, a conveyance roller 4, a platen roller 5, a conveyance roller 6, and an ejection roller 7 for conveying the sheet S are also provided in the conveyance path. These rollers are an example of a conveyance unit for conveying a sheet on a translucent platen. The resist roller 3 is an example of a first conveyance unit. The conveyance roller 4 is an example of a second conveyance unit that is located downstream of the resist roller 3 in the conveyance path and driven independently of the resist roller 3. The platen roller 5 is an example of a third conveyance unit that is located downstream of the conveyance roller 4 in the conveyance path and driven together with the conveyance roller 4. A flapper 21 guides the sheet S whose first surface (front surface) has been read to a reversal path 20, when a second surface (back surface) of the sheet S is to be read. An ejection tray 31 receives the sheet S that has been read.

A flow-reading platen 201 used in the flow-reading mode and a fixed-reading platen 202 used in the fixed-reading mode are provided in the reader 200. The flow-reading platen 201 and the fixed-reading platen 202 are each made of a translucent substance (e.g. glass). A scanner unit 209 includes a lamp 203 for illuminating the sheet S and a mirror 204. In the flow-reading mode, the scanner unit 209 is stationary below the flow-reading platen 201. In the fixed-reading mode, the scanner unit 209 moves directly below the fixed-reading platen 202 in the arrow direction (sub-scanning direction) at a constant speed. In other words, the sheet S moves in the sub-scanning direction in the flow-reading mode, whereas the scanner unit 209 moves in the sub-scanning direction in the fixed-reading mode. The mirror 204, a mirror 205, and a mirror 206 guide light reflected from the sheet S, to a lens 207. The lens 207 focuses the reflected light onto an image sensor unit 210 to form an image. The scanner unit 209 and the image sensor unit 210 function as a reading unit for reading the sheet S being conveyed on the flow-reading platen 201. A motor M1 moves the scanner unit 209 in the right and left direction in FIG. 1A. The motor M1 functions as a moving unit for moving the scanner unit 209 to change the reading position of the scanner unit 209 with respect to the platen.

[Sheet Conveyance Method]

The plurality of sheets S held on the sheet tray 30 are fed to the conveyance path by the feeding roller 1. The plurality of sheets S are separated from each other by the separation roller 2 and the separation pad 8, and conveyed downstream in the conveyance path. The sheet sensor 16 for detecting whether or not a sheet S is present is provided on the sheet tray 30. The sheet sensor 12 is also provided downstream of the separation roller 2.

Figure 1B:
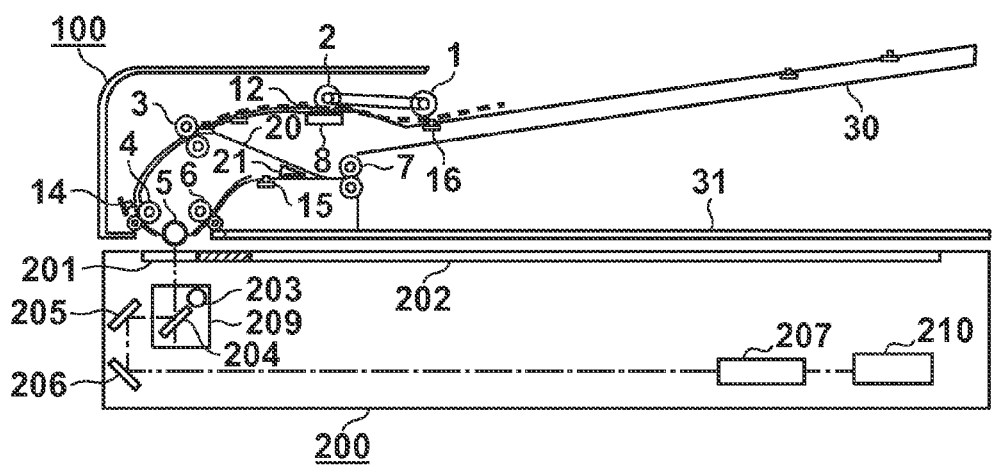
Figure 1C:
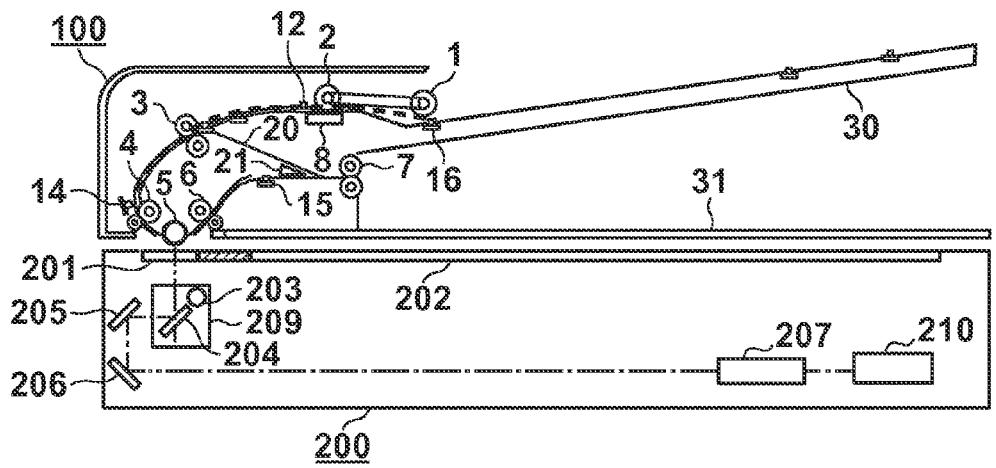

Each sheet S separated by the separation roller 2 and the separation pad 8 is conveyed to and hits the resist roller 3, as shown in FIG. 1B. The skew of the sheet S is corrected in this way. When the resist roller 3 starts rotating, the sheet S is further conveyed downstream in the conveyance direction, as shown in FIG. 1C. The conveyance roller 4 is provided downstream of the resist roller 3. The conveyance roller 4 further conveys the sheet S in the direction to the vicinity of the flow-reading platen 201. The sheet sensor 14 is provided upstream of the conveyance roller 4. When the sheet sensor 14 detects the leading edge of the sheet S, the counting of clocks of a motor (not shown) which is the drive source of the conveyance roller 4 and the platen roller 5 starts. The number of clocks counted indicates the position of the leading edge of the sheet S (the distance from the sheet sensor 14). The timing at which the leading edge of the sheet S passes through the sheet reading position can be accurately determined from the number of clocks. Thus, the scanner unit 209 and the image sensor unit 210 read the first surface of the sheet S, based on the leading edge of the sheet S.

Figure 2A:
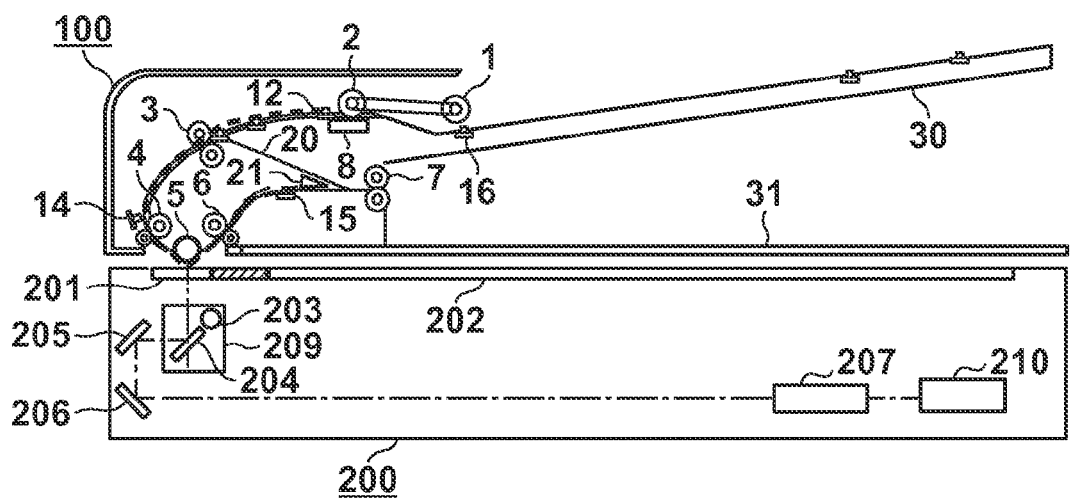
FIGS. 2A and 2B are sectional views of an image reading apparatus.
Figure 2B:
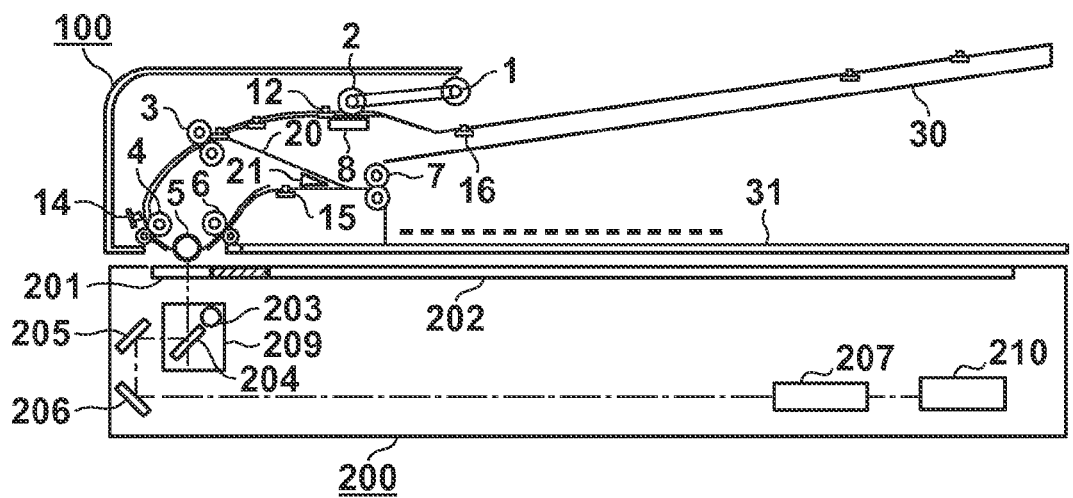

When the sheet sensor 12 detects the trailing edge of the sheet S, the sheet sensor 16 detects whether or not the next sheet S is present on the sheet tray 30, as shown in FIG. 2A. The detection result of the sheet sensor 16 is notified to a control unit. The ejection roller 7 ejects the sheet S to the ejection tray 31, when a predetermined time has passed after the sheet sensor 15 detects the trailing edge of the sheet S. Feeding, capturing, and ejecting a sheet S are repeated until there is no more sheet S on the sheet tray 30. If the sheet sensor 16 detects no sheet S when the sheet sensor 12 detects the trailing edge of the sheet S, the control unit determines that the sheet S being conveyed is the last sheet, as shown in FIG. 2A. When the last sheet is ejected to the ejection tray 31, the control unit stops motors which are the drive sources of the rollers, as shown in FIG. 2B.

[Double-Sided Sheet Reading Process]

Figure 3A:
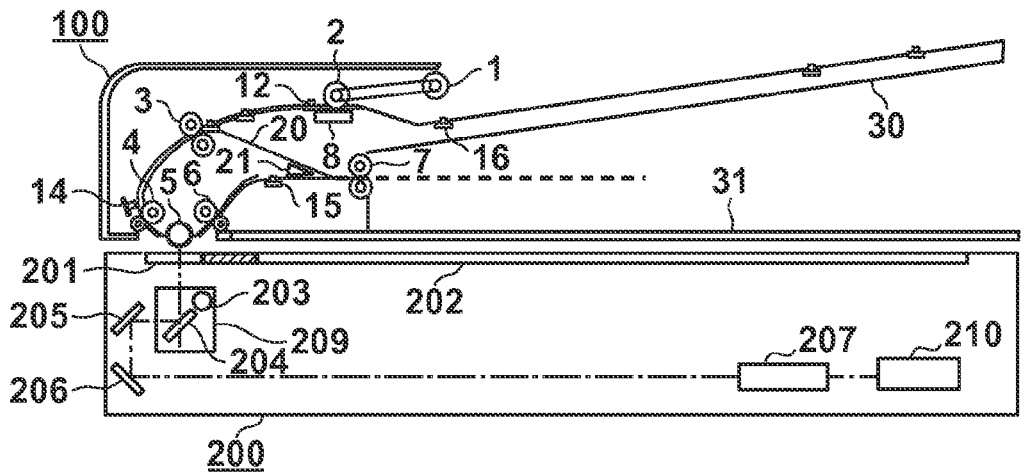
FIGS. 3A to 3C are sectional views of an image reading apparatus.
Figure 3B:
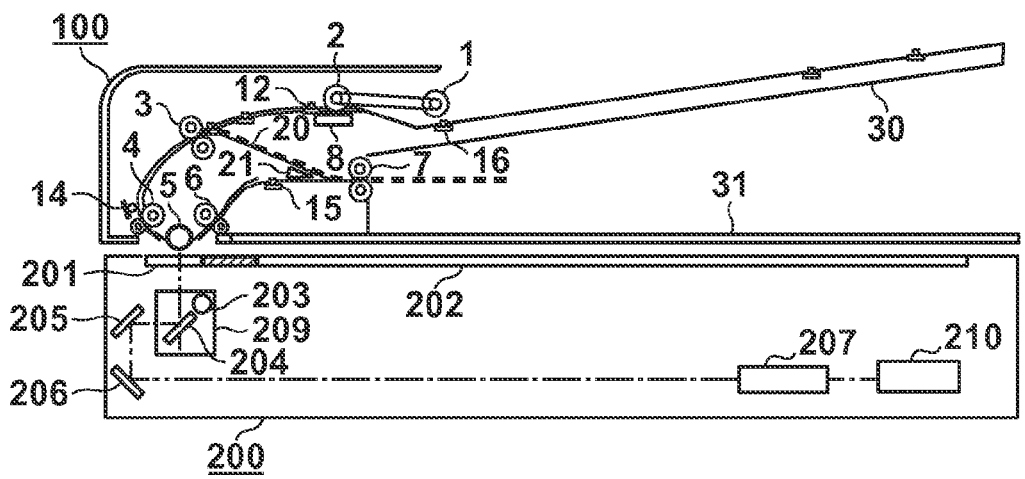
Figure 3C:
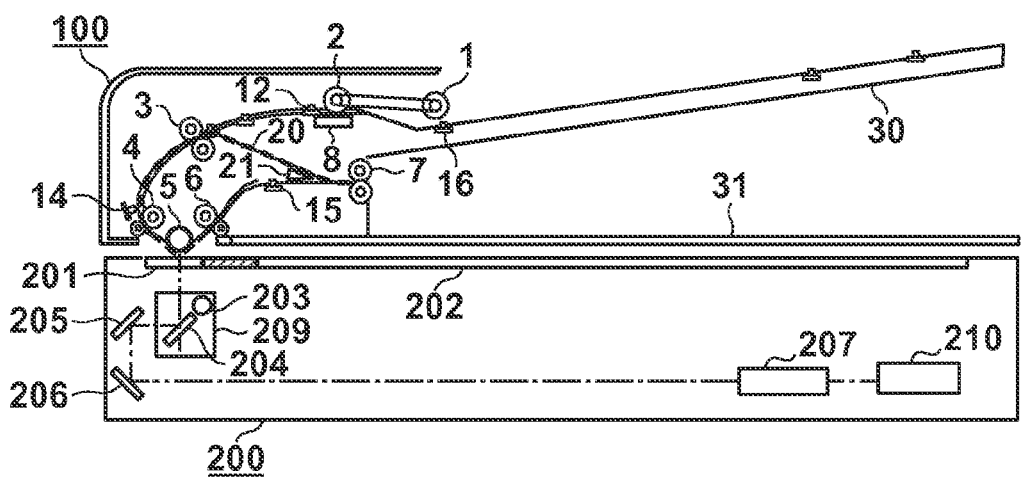

After the first surface of the sheet S is read, the sheet S is conveyed so that the trailing edge of the sheet S is in the vicinity of the ejection roller 7, as shown in FIG. 3A. When the trailing edge of the sheet S arrives at the vicinity of the ejection roller (e.g. 18 mm short of the ejection roller 7), the conveyance of the sheet S stops. The sheet S is then reversed to read the second surface. In a state where the sheet S is inserted in the ejection roller 7, the control unit switches the flapper 21 and reverses the direction of rotation of the ejection roller 7, as shown in FIG. 3B. As a result, the sheet S is conveyed in the reversal path 20. The leading edge of the sheet S passes through the reversal path 20 and hits the resist roller 3, where the skew of the sheet S is corrected. The control unit then drives the resist roller 3. The leading edge of the sheet S passes through the conveyance roller 4, and the sheet S is conveyed again to the flow-reading platen 201 by the platen roller 5, as shown in FIG. 3C. The second surface of the sheet is thereby read in the sheet reading position on the flow-reading platen 201.

[Block Diagram]

Figure 4:
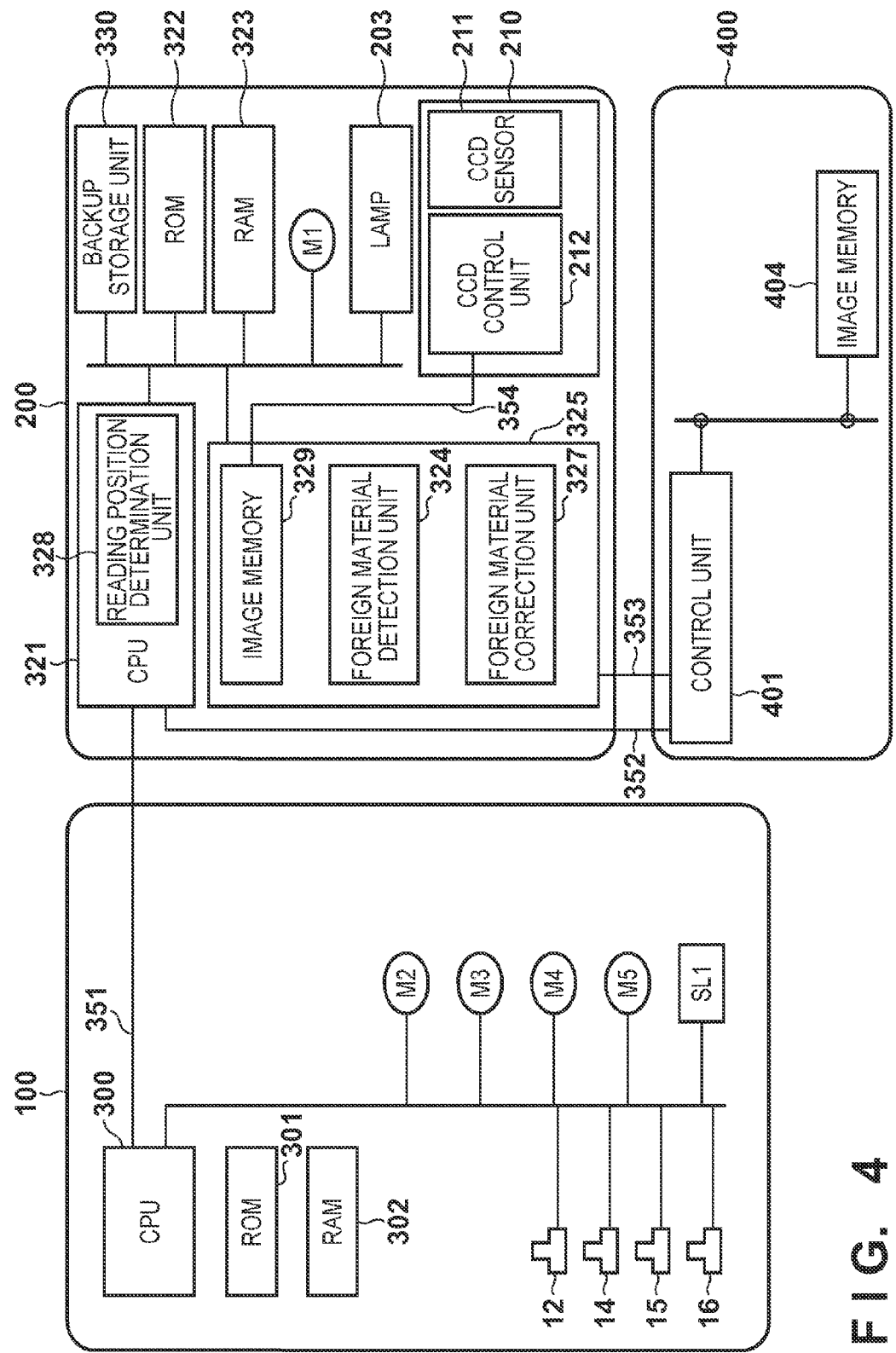
FIG. 4 is a diagram showing a control unit.

FIG. 4 is a block diagram showing a control unit for the ADF 100 and the reader 200. The ADF 100 is controlled by a CPU 300. A ROM 301 stores a control program for the ADF 100. A RAM 302 stores input data and working data for program control. The sheet sensors 12, 14, 15, and 16 are connected to an input port of the CPU 300. Motors M2, M3, M4, and M5 and a solenoid SL1 are connected to an output port of the CPU 300 via driver circuits (not shown). The motor M2 is a drive source for driving the feeding roller 1 and the separation roller 2. The motor M3 is a drive source for driving the resist roller 3. The motor M4 is a drive source for driving the conveyance roller 4, the platen roller 5, and the conveyance roller 6. The motor M5 is a drive source for driving the ejection roller 7. The solenoid SL1 is a drive source for driving the flapper 21. The CPU 300 controls the conveyance of the sheet S, according to the control program stored in the ROM 301 connected to the CPU 300 via a bus line.

The reader 200 is controlled by a CPU 321. The CPU 321 serially communicates with the CPU 300 in the ADF 100 via a communication line 351, to transmit and receive control data and commands. A sheet leading edge signal output from the sheet sensor 14 is also notified to the CPU 321 in the reader 200, via the communication line 351. A ROM 322 stores a control program. A RAM 323 stores input data and working data for program control. A backup storage unit 330 stores part of working data and input data for the control program. The backup storage unit 330 is a storage device capable of retaining the stored data even when power supply from an external power source is stopped. The motor M1 is a drive source for moving the scanner unit 209. The motor M1 and the CPU 321 are connected to each other via a driver circuit (not shown) or the like. The lamp 203 for irradiating the sheet S with light and the image sensor unit 210 for reading the sheet S are connected to the CPU 321. The image sensor unit 210 includes a CCD sensor 211 and a CCD control unit 212. The CCD control unit 212 controls the CCD sensor 211, and generates and outputs an image signal. The image signal is stored in an image memory 329 in an image processing unit 325. The CPU 321 controls the image sensor unit 210 via a communication line 354. A foreign material detection unit 324 in the image processing unit 325 is an example of a foreign material detection unit, and detects any foreign material image when no sheet S is present on the flow-reading platen 201. For example, the foreign material detection unit 324 detects an image (a foreign material image caused by a foreign material) included in the result of reading one main scanning line obtained by the image sensor unit 210. A foreign material correction unit 327 corrects the foreign material image included in the image obtained by the image sensor unit 210, according to a known algorithm. The foreign material detection unit 324 and the foreign material correction unit 327 may be realized by the CPU 321, or by a logic circuit such as an application-specific integrated circuit (ASIC).

The CPU 321 may function as a reading position determination unit 328. The reading position determination unit 328 is an example of a position determination unit. The reading position determination unit 328 determines a reading position candidate with fewest foreign material images (e.g. a reading position candidate in which no foreign material image is detected) from among a plurality of reading position candidates for which the foreign material detection process has been completed, as the sheet reading position. The reading position determination unit 328 may be realized by, for example, an ASIC constituting the image processing unit 325.

To carry out sheet conveyance, the CPU 321 in the reader 200 transmits a command related to sheet conveyance control to the CPU 300 in the ADF 100 via the communication line 351. The CPU 300 monitors the detection results of the sheet sensors 12 to 16 placed in the conveyance path and drives the motors M2 to M5 and the solenoid SL1, to carry out sheet conveyance. Thus, the CPU 321 as a master CPU transmits a command to the CPU 300 as a slave CPU to carry out sheet conveyance.

The image memory 329 in the image processing unit 325 is a storage device for temporarily storing image data from the image sensor unit 210. The foreign material detection unit 324 detects a foreign material image such as a streak from image data of one main scanning line. The foreign material detection unit 324 performs foreign material detection not only when the sheet reading position is determined but also when the sheet is being read. This is in consideration of the possibility that a foreign material newly adheres to the reading position during sheet conveyance, and the possibility that the number of foreign material images cannot be reduced to zero by changing the reading position. For example when the sheet is being read, the foreign material correction unit 327 linearly interpolates the foreign material image detected by the foreign material detection unit 324, using neighboring pixel data. The sheet is read per main scanning line extending in the main scanning direction. One main scanning line is made up of a plurality of pixels. Accordingly, when one pixel has a foreign material image, it appears as a streak image extending in the sub-scanning direction. The foreign material correction unit 327 corrects the foreign material image so as not to be output as a streak image.

When a reading job starts, the CPU 321 causes the image processing unit 325 to generate a shading correction coefficient, to prepare for image reading. An image formed by the lens 207 is converted to image data by the image sensor unit 210. The image data is sequentially transmitted to a control unit 401 in a controller unit 400 via an image communication line 353.

In the fixed-reading mode, the CPU 321 transmits an image leading edge signal to the control unit 401 via a communication line 352, at adjusted timing. In the flow-reading mode, the CPU 321 transmits an image leading edge signal to the control unit 401 via the communication line 352, when triggered by a sheet leading edge detection signal output from the sheet sensor 14. The image leading edge signal is a signal of reference for the leading edge of the image data obtained from the sheet.

The controller unit 400 is a unit for integrally controlling the image reading system that includes the reader 200 and the ADF 100. The controller unit 400 includes the control unit 401 and an image memory 404. When the image data read by the reader 200 is transmitted to the controller unit 400, the control unit 401 writes the image data to the image memory 404. The image data written in the image memory 404 may be, for example, output to a printer unit (not shown).

[Foreign Material Detection Process]

When the ADF 100 conveys the sheet S to the flow-reading platen 201, a foreign material (such as small dust or hair) attached to the sheet S might be conveyed together. If such a foreign material adheres to the flow-reading platen 201, the foreign material is read as an image, as a result of which the foreign material part appears in image data as a colored streak. To prevent such a foreign material image from being included in the image obtained from the sheet, it is necessary to detect in which part of the flow-reading platen 201 the foreign material is present. This is called a foreign material detection process. In the foreign material detection process, in a state where no sheet S is present on the flow-reading platen 201, the image sensor unit 210 reads the surface of the rotating platen roller 5 situated near the sheet reading position. Since a foreign material is typically black, the platen roller 5 is a white roller. The foreign material detection unit 324 detects a foreign material image from image data of one main scanning line output from the image sensor unit 210. For example, the foreign material detection unit 324 compares the luminance level of each pixel in the image data of one main scanning line, with a threshold. If the luminance level is lower than the threshold, the foreign material detection unit 324 determines that a foreign material adheres to the pixel. The scanner unit 209 moves between a plurality of reading position candidates, to obtain image data of one main scanning line for each of the plurality of reading position candidates. The foreign material detection unit 324 in this embodiment performs the foreign material detection on all of the plurality of reading position candidates when there is enough time, and performs the foreign material detection only on part of the plurality of reading position candidates when there is not enough time. The foreign material detection unit 324 generates foreign material-related information for each main scanning line as a reading position candidate. Examples of the foreign material-related information include the number of foreign material images, the position of each foreign material image (foreign material pixel), and the number of successive foreign material images in the main scanning direction (the foreign material width). Based on the number of foreign material images and the foreign material width, the reading position determination unit 328 determines whether or not the foreign material images can be corrected by the foreign material correction unit 327. The maximum number of foreign material images or the maximum foreign material width that can be corrected differs depending on the performance of the algorithm employed by the foreign material correction unit 327. Even when one or more foreign material images are included in a reading position candidate, the reading position candidate may be determined as the sheet reading position if the number of foreign material images or the foreign material width is less than or equal to the maximum number of foreign material images or the maximum foreign material width. This has the advantage in that the sheet reading position can be determined faster than in the case of searching for a reading position candidate with no foreign material at all.

[Foreign Material Correction Process]

Figure 5A:
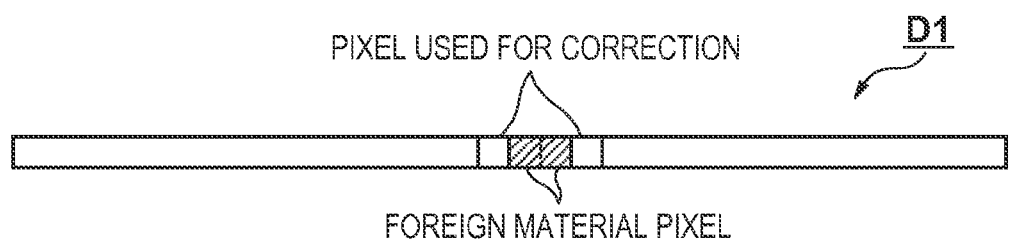
FIGS. 5A and 5B are diagrams showing an example of a foreign material correction process.
Figure 5B:
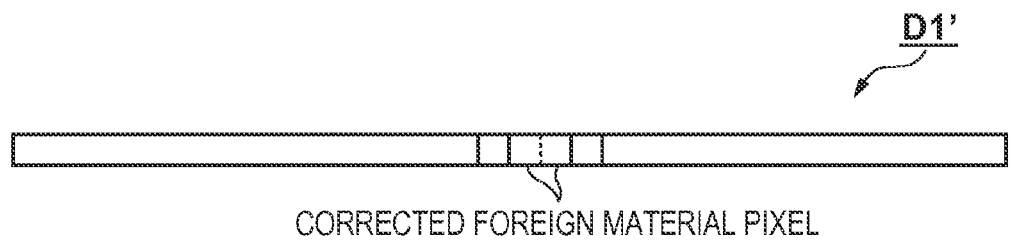

The foreign material correction unit 327 corrects the foreign material image detected by the foreign material detection unit 324, to prevent a streak (a line image not present in the original) from appearing in the read image at the position of the foreign material. FIG. 5A shows image data D1 of one main scanning line including two foreign material pixels. The foreign material correction unit 327 corrects the foreign material pixels using data of pixels adjacent to the foreign material pixels, as shown in FIG. 5B. If the density of the pixels adjacent to the foreign material pixels on both sides is nearly white, the foreign material pixels are corrected to white, as shown in FIG. 5B. An example of the foreign material correction algorithm is an algorithm of linear interpolation using data of adjacent pixels. In the case where the width of foreign material images is within a predetermined width, the foreign material images are made unnoticeable by this foreign material correction. Thus, the foreign material correction unit 327 functions as a correction unit for correcting a foreign material image in an image read from the sheet S.

[Normal Foreign Material Avoidance Control]

Figure 6A:
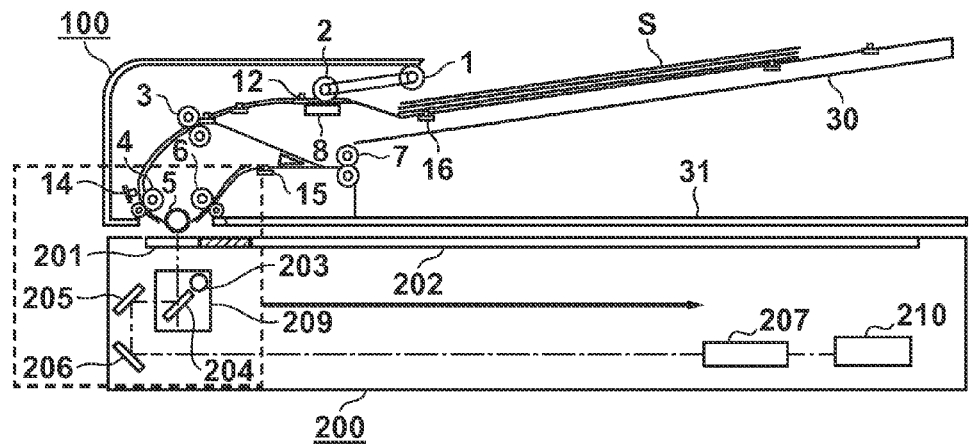
FIGS. 6A and 6B are sectional views of an image reading apparatus.
Figure 6B:
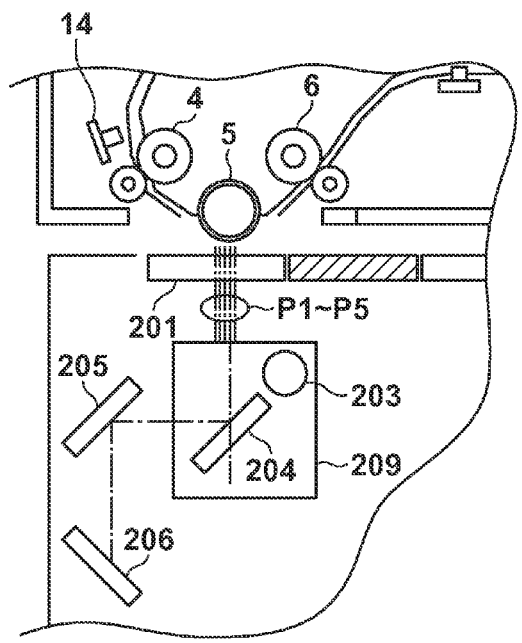

As shown in FIGS. 6A and 6B, there are Na reading position candidates as the reading position candidates of the flow-reading platen 201. Reading position candidates P1 to P5 are shown in this example. The CPU 321 selects one of the Na reading position candidates, and drives the motor M1 to move the scanner unit 209 so that the optical axis matches the selected reading position candidate. The reading position determination unit 328 determines a candidate with fewest foreign materials (e.g. a candidate in which no foreign material is detected) from among the Na reading position candidates, as the sheet reading position. The reading position determination unit 328 also stores the position information of the determined candidate, in the backup storage unit 330. This is called normal foreign material avoidance control. The normal foreign material avoidance control is an example of a first mode in which all reading position candidates are subject to the detection process. In the normal foreign material avoidance control, the foreign material detection is performed on all of the Na reading position candidates, unless a reading position candidate in which no foreign material is detected is found. The position determination process may be terminated when a reading position candidate in which no foreign material is detected is found. Since the normal foreign material avoidance control has the possibility that the foreign material detection process is performed on all candidates, the time required for the foreign material detection process and the position determination process is expected to be long. However, there is also the advantage in that a reading position candidate where the influence of foreign material images is smallest can be determined as the sheet reading position. The normal foreign material avoidance is performed at timing when little impact is assumed even if the foreign material detection process and the position determination process take time, such as when the flow-reading mode (sheet reading job) ends and the image reading apparatus is stopped.

FIG. 7 is a flowchart showing the normal foreign material avoidance control performed by the CPU 321 in the reader 200. For example, the CPU 321 (the reading position determination unit 328) starts the normal foreign material avoidance after the sheet reading job ends.

In step S701, the CPU 321 starts the foreign material detection from the sheet reading position used in the sheet reading job executed immediately before. This saves time and power, because the scanner unit 209 does not need to be moved. Alternatively, the CPU 321 may start the foreign material detection from a specific reading position candidate (e.g. a candidate at either end such as P1 or P5). The CPU 321 instructs the CPU 300 to rotate the motor M4 for driving the platen roller 5. The CPU 321 turns on the lamp 203, and instructs the image sensor unit 210 to output image data of one main scanning line. The CPU 321 instructs the foreign material detection unit 324 to perform the foreign material detection on the image data of one main scanning line output from the image sensor unit 210. The foreign material detection unit 324 reads the image data of one main scanning line from the image memory, and performs the foreign material detection process. The foreign material detection unit 324 may perform the foreign material detection on the target main scanning line, while taking into account image data of a plurality of adjacent main scanning lines. By taking into account the image data of the plurality of adjacent main scanning lines, it is possible to determine whether or not a streak is caused by a foreign material. During the rotation of the platen roller 5, a foreign material moves with the rotation of the platen roller 5, and is detected or is not detected. Whether a foreign material is a foreign material that moves without remaining as a streak in an image or a foreign material assumed to have adhered to the flow-reading platen 201 can be determined in the above-mentioned manner. The foreign material detection unit 324 passes the foreign material detection result (information indicating the number of foreign material images, the foreign material width, and the position (address) of each foreign material image) to the CPU 321. In step S702, the CPU 321 increments a counter for counting the number of reading position candidates for which the foreign material detection process has been completed, by 1. The count is used to determine whether or not the foreign material detection process has been completed for all of the Na reading position candidates. The initial value of the counter is 1.

In step S703, the CPU 321 determines whether or not the foreign material detection unit 324 detects a foreign material image in the current reading position candidate. If the number of foreign material images is zero, the CPU 321 proceeds to step S706. In step S706, the CPU 321 determines the current reading position candidate as the sheet reading position. In step S709, the CPU 321 stores position information indicating the reading position candidate determined as the sheet reading position, in the backup storage unit 330. Thus, the normal foreign material avoidance control may be terminated when the reading position candidate in which the number of foreign material images is zero is found.

If one or more foreign material images are detected in step S703, the CPU 321 proceeds to step S704. In step S704, the CPU 321 temporarily stores the number of foreign materials in the current reading position candidate, in the RAM 323. The number of foreign materials for each reading position candidate is used to specify a candidate with fewest foreign materials, after the foreign material detection is completed for all reading position candidates.

In step S705, the CPU 321 determines whether or not the foreign material detection has been completed for all reading position candidates. For example, the CPU 321 determines whether or not the number (count) of candidates for which the foreign material detection has been completed exceeds Na. If the foreign material detection has been completed for all candidates, the CPU 321 proceeds to step S707. In step S707, the CPU 321 determines a candidate with fewest foreign materials from among all reading position candidates for which the foreign material detection has been completed, as the next sheet reading position. The CPU 321 controls the motor M1, to move the scanner unit 209 to the sheet reading position. In step S709, the CPU 321 stores the position information of the sheet reading position in the backup storage unit 330, and ends the normal foreign material avoidance control.

On the other hand, if the foreign material detection has not been completed for all candidates in step S705, the CPU 321 proceeds to step S708. In step S708, the CPU 321 controls the motor M1 to move the scanner unit 209 to the next reading position candidate, and returns to step S701. In step S701, the CPU 321 controls the foreign material detection unit 324 to perform the foreign material detection on the next candidate. The process from step S702 is as described above.

By the normal foreign material avoidance control, a reading position candidate in which no foreign material is detected or with fewest foreign materials is determined as the sheet reading position, and its position information is stored in the backup storage unit 330. The influence of foreign material images can be reduced by reading the sheet S using the sheet reading position indicated by the position information stored in the backup storage unit 330. It is possible to perform the normal foreign material avoidance control immediately before the start of the job. In the normal foreign material avoidance control, however, the foreign material detection is performed on all of the Na reading position candidates at the maximum, so that the wait time before starting to read the sheet is long. Besides, the sheet S needs to be stopped in the conveyance path during the normal foreign material avoidance control. In view of this, the following quick foreign material avoidance control is employed in the case where foreign material avoidance is performed immediately before the start of the job, with it being possible to reduce the wait time.

[Quick Foreign Material Avoidance Control]

The quick foreign material avoidance control is an example of a second mode in which part of the predetermined number of reading position candidates are subject to the detection process. In the case where the image reading apparatus returns from the sleep mode or is activated with power being supplied from the power source, whether or not a foreign material is present on the flow-reading platen 201 is unclear. For example, if the user leaves the cover of the ADF 100 open in the sleep mode, a foreign material might adhere to the flow-reading platen 201. In the sleep mode, however, whether or not a foreign material is present cannot be detected because power to the reader 200 and the ADF 100 is basically stopped.

Here, consider the case where the normal foreign material avoidance control is employed to perform the foreign material detection on all of the Na reading position candidates and determine a candidate in which no foreign material is detected as the sheet reading position. However, it takes about hundreds of milliseconds to perform the foreign material detection on all candidates, as an example. This causes a delay in the completion of the flow-reading mode immediately after return from the sleep mode. As mentioned earlier, the surface of the platen roller 5 that is rotating needs to be read in the foreign material detection. Therefore, the sheet S cannot be conveyed to the vicinity of the sheet reading position during the foreign material detection. In other words, it is necessary to wait for the end of the foreign material avoidance control, before conveying the sheet S to the vicinity of the sheet reading position. Moreover, since the platen roller 5 and the conveyance roller 4 are driven by the same drive source, the conveyance roller 4 rotates together with the platen roller 5. Hence, the sheet S can be only conveyed to a point upstream of the conveyance roller 4, until the end of the foreign material detection.

Accordingly, in this embodiment, the foreign material detection is performed on part of the candidates, and a reading position candidate with fewest foreign material images from among a plurality of reading position candidates for which the foreign material detection has been completed is determined as the sheet reading position. This reduces the wait time. Since the foreign material detection is performed only on part of the candidates, there is a possibility that a reading position candidate in which the number of foreign material images is not zero is selected. However, given that the foreign material correction unit 327 can reduce foreign material images, the wait time reduction and the foreign material image reduction are both achieved in the end. Such control that performs the foreign material detection only on part of the candidates is hereafter referred to as quick foreign material avoidance control, for convenience's sake.

Figure 8:
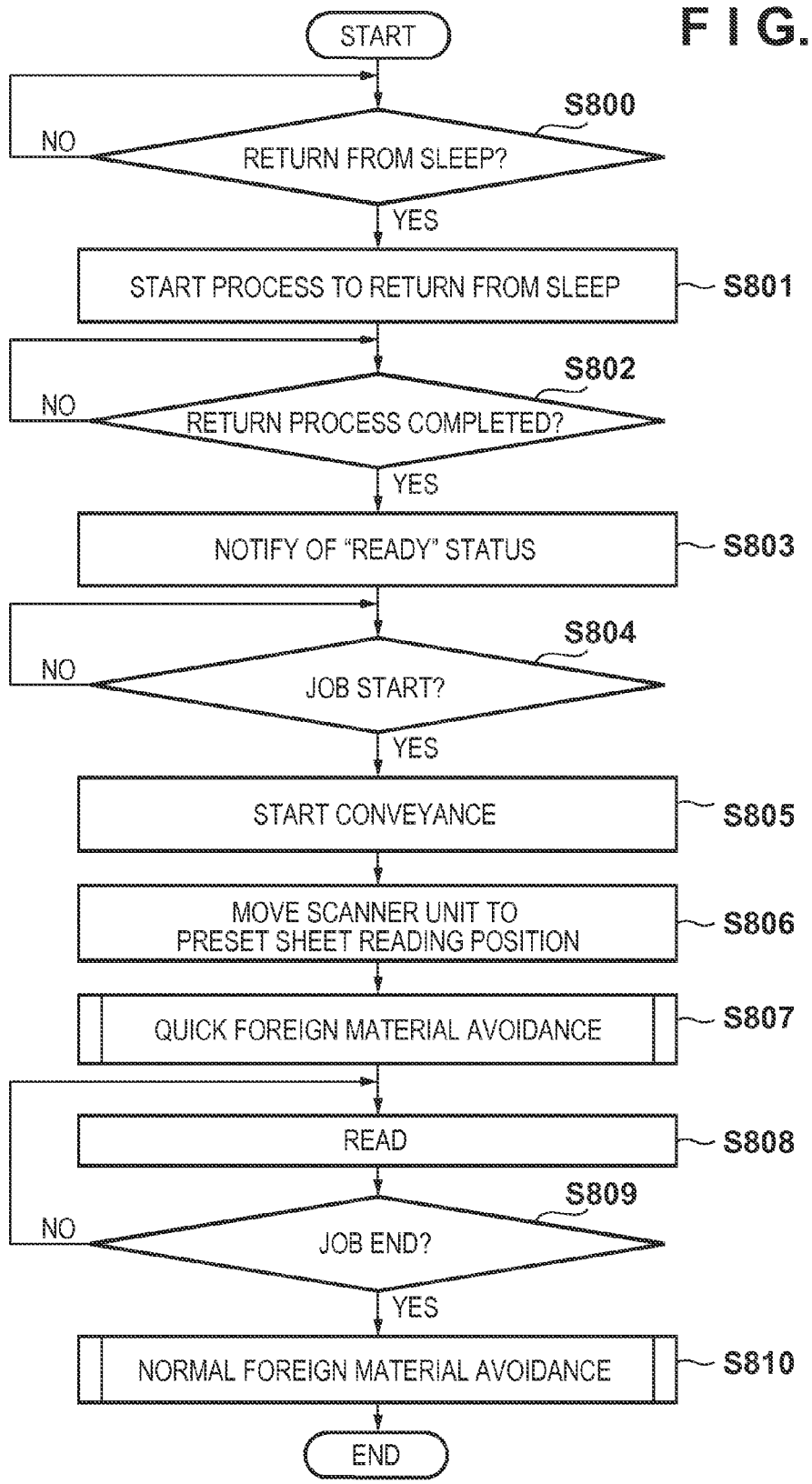
FIG. 8 is a flowchart showing an example of an image reading process.

FIG. 8 is a flowchart showing the flow-reading mode executed by the CPU 321. This flow-reading mode is executed upon return from the sleep mode, and includes the quick foreign material avoidance control. In step S800, the CPU 321 determines whether or not a condition for performing the quick foreign material avoidance control is satisfied. For example, the CPU 321 determines whether or not the ADF 100 returns from the sleep mode. Upon receiving a return instruction from the control unit 401, the CPU 321 determines that it is a timing when the ADF 100 returns from the sleep mode. In the case of determining that the ADF 100 is to return from the sleep mode, the CPU 321 proceeds to step S801.

In step S801, the CPU 321 performs a process to return from the sleep mode. An example of the return process is gain/offset adjustment for adjusting the light intensity of the lamp 203. In step S802, the CPU 321 determines whether or not the return process has been completed. If the return process has been completed, the CPU 321 proceeds to step S803. In step S803, the CPU 321 notifies the control unit 401 of the "READY" status. The "READY" status indicates that the reader 200 and the ADF 100 are ready for reading.

In step S804, the CPU 321 determines whether or not a flow-reading mode start instruction is received from the control unit 401 in the controller unit 400. Upon receiving the flow-reading mode start instruction, the CPU 321 proceeds to step S805. In step S805, the CPU 321 causes the ADF 100 to start sheet conveyance. For example, the CPU 321 issues a sheet conveyance request to the CPU 300 in the ADF, so that the CPU 300 starts sheet conveyance. The CPU 300 drives the motor M2 to convey the sheet S to the resist roller 3. The CPU 300 stops the motor M2, when a predetermined time has passed after the sheet sensor 12 detects the leading edge of the sheet S. As a result, the sheet S hits the resist roller 3 and is looped (bent). When the control unit 401 issues a sheet reading request, the CPU 321 causes the CPU 300 to rotate the motors M2 and M3.

In step S806, the CPU 321 drives the motor M1 to move the scanner unit 209 to a preset sheet reading position. For example, the CPU 321 reads position information stored in the backup storage unit 330, and moves the scanner unit 209 to the sheet reading position indicated by the position information. The position information indicates the position of a reading position candidate determined to have no foreign material or fewest foreign materials in the previous normal foreign material avoidance control. When the scanner unit 209 arrives at the sheet reading position, the CPU 321 proceeds to step S807.

Figure 9:
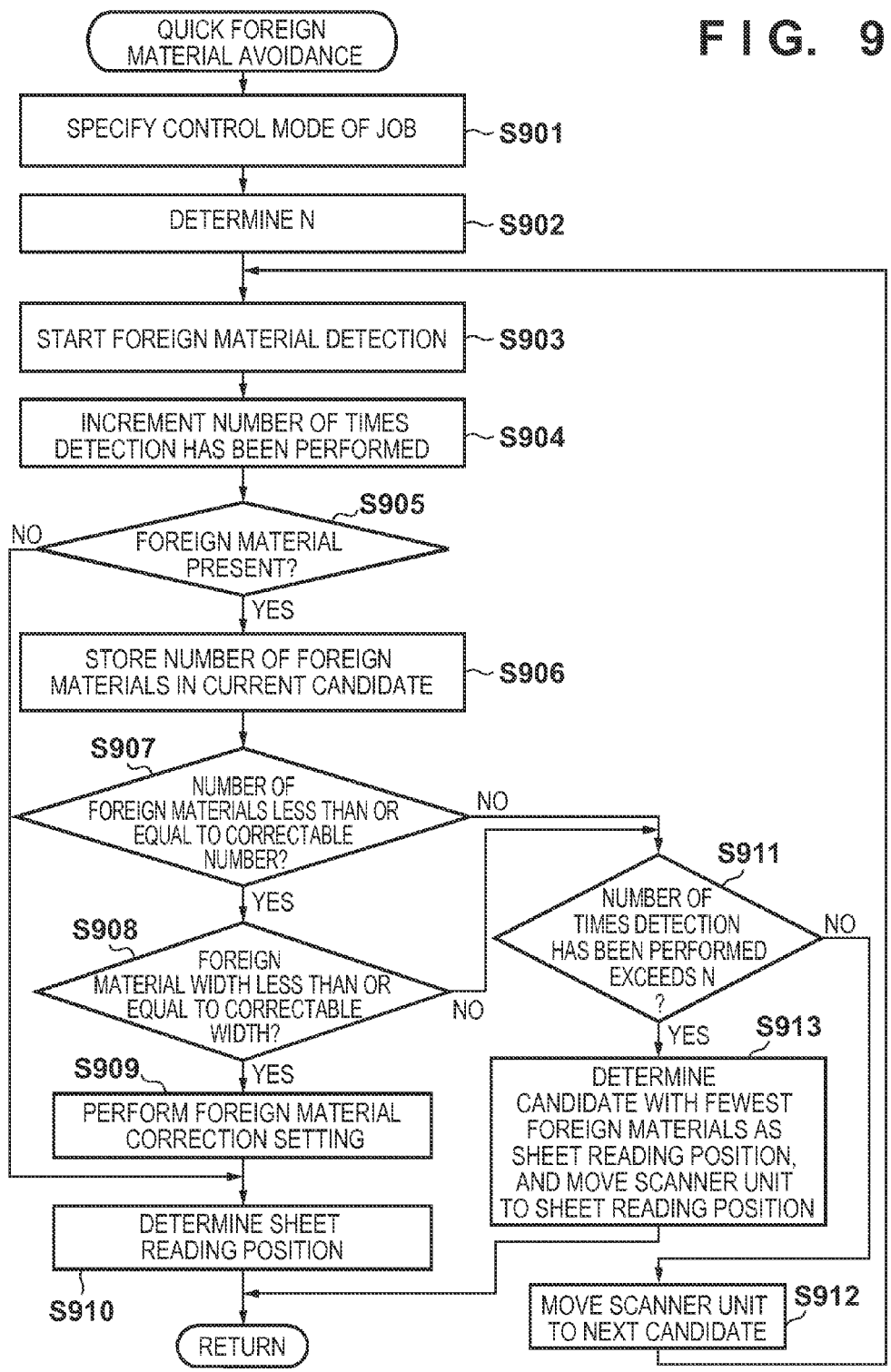
FIG. 9 is a flowchart showing an example of quick foreign material avoidance.

In step S807, the CPU 321 starts the quick foreign material avoidance control. The quick foreign material avoidance control is described below, with reference to a flowchart in FIG. 9. FIG. 9 shows the quick foreign material avoidance control performed by the CPU 321 (the reading position determination unit 328) in the reader 200. The wait time cannot be reduced if the foreign material detection is performed on all of the Na reading position candidates, as mentioned earlier. The following method is accordingly used.

Figure 10:
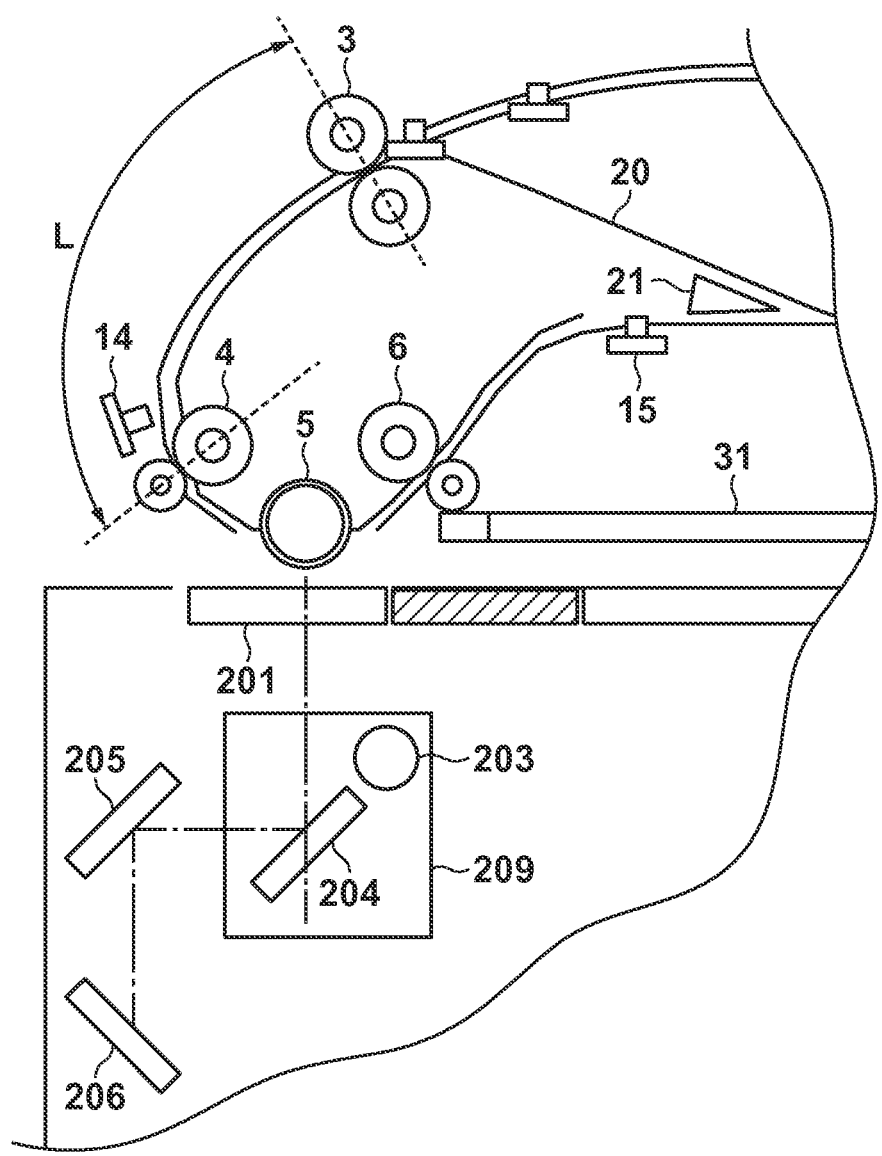
FIG. 10 is a sectional view of an image reading apparatus.

FIG. 10 is a partially enlarged view of the conveyance path shown in FIGS. 1A to 1C. Let L be the distance (conveyance path length) from the resist roller 3 to the conveyance roller 4 along the conveyance path. Let N be the number (upper limit number) of times the foreign material detection can be performed while the sheet S is being conveyed in the section from the resist roller 3 to the conveyance roller 4. If the number of times the detection is performed is less than or equal to the upper limit number N, there is no extension of the wait time. That is, after the start of driving the resist roller 3, the sheet reading can be started without stopping the conveyance of the sheet S.

The upper limit number N depends on the conveyance path length L, the conveyance velocity V of the sheet S, and the detection process time Tg taken to perform the foreign material detection once.

$$N=L/V/Tg \text{ (where } N<Na\text{)}.$$

As can be seen from this equation, the upper limit number N depends on the conveyance velocity V. Accordingly, the upper limit number N changes in the case where the conveyance velocity in this section changes (for example, in the case where the reading velocity is different between a multicolor reading mode and a monochrome reading mode or in the case where the conveyance velocity is changed for silent operation or the like). The CPU 321 may determine the upper limit number N depending on the mode set for the job. In this embodiment, the upper limit number N is assumed to be less than the total number Na of reading position candidates.

In step S901 in FIG. 9, the CPU 321 specifies which control mode is set for the job. Examples of the control mode include the multicolor reading mode and the monochrome reading mode. In step S902, the CPU 321 determines the upper limit number N for the specified control mode. For example, the conveyance velocity Vc in the multicolor reading mode and the conveyance velocity Vwb in the monochrome reading mode are stored in the ROM 322. The CPU 321 reads the conveyance velocity V in the specified control mode from the ROM 322, and calculates the upper limit number from the foregoing equation. The conveyance path length L and the detection process time Tg are constants, and are stored in the ROM 322. Alternatively, the upper limit number N in each control mode may be stored in the ROM 322 beforehand. In such a case, the CPU 321 reads the upper limit number N corresponding to the specified control mode from the ROM 322, thereby determining the upper limit number N. The mathematical operation can be omitted in this way. Thus, the CPU 321 functions as an upper limit number determination unit for determining the upper limit number N of times the foreign material detection unit 324 performs the detection process.

In step S903, the CPU 321 starts the foreign material detection. The CPU 321 reads the position information stored in the backup storage unit 330, and drives the motor M1 so that the scanner unit 209 is located at the sheet reading position indicated by the position information. The CPU 321 instructs the CPU 300 to rotate the motor M4 for driving the platen roller 5. The CPU 321 also turns on the lamp 203, and instructs the image sensor unit 210 to output image data of one main scanning line. The CPU 321 instructs the foreign material detection unit 324 to perform the foreign material detection on the image data of one main scanning line output from the image sensor unit 210. The foreign material detection unit 324 passes the foreign material detection result (information indicating the number of foreign material images, the foreign material width, and the position of each foreign material image) to the CPU 321.

In step S904, the CPU 321 increments the counter for counting the number of reading position candidates for which the foreign material detection process has been completed, by 1. The initial value of the counter is 1. The counter may be realized by a logic circuit, or realized by software through the CPU 321. Thus, the counter functions as a counting unit for counting the number of times the foreign material detection unit 324 has completed the detection process. In step S905, the CPU 321 determines whether or not the foreign material detection unit 324 detects a foreign material in the current reading position candidate. If the number of foreign material images is zero, the CPU 321 proceeds to step S910. In step S910, the CPU 321 determines the current reading position candidate as the next sheet reading position. Thus, the quick foreign material avoidance control is terminated when the reading position candidate in which the number of foreign material images is zero is found.

If one or more foreign material images are detected in step S905, the CPU 321 proceeds to step S906. In step S906, the CPU 321 temporarily stores the number n of foreign materials in the current reading position candidate, in the RAM 323. The temporarily stored number n of foreign materials is used to specify a candidate with fewest foreign materials, after the foreign material detection is completed for all reading position candidates. Thus, the CPU 321 functions as a number counting unit for counting the number of foreign material images detected by the foreign material detection unit 324 from the result of reading one main scanning line.

In step S907, the CPU 321 determines whether or not the current number n of foreign materials is less than or equal to the maximum number nmax of foreign materials correctable by the foreign material correction unit 327. If the current number n of foreign materials is less than or equal to the maximum number nmax of foreign materials, the CPU 321 proceeds to step S908. Thus, the CPU 321 functions as a determination unit for determining whether or not the number of foreign material images is less than or equal to the maximum number of foreign material images correctable by the foreign material correction unit 327. In step S908, the CPU 321 determines whether or not the currently detected width w of foreign material images is less than or equal to the maximum width wmax correctable by the foreign material correction unit 327. Thus, the CPU 321 functions as a foreign material width counting unit for counting the foreign material width which is the number of foreign material images detected by the foreign material detection unit 324 from the result of reading one main scanning line and is the number of successive foreign material images in the main scanning direction. When one or more groups of a plurality of foreign material images are found, the CPU 321 determines the foreign material width for each group, and compares the foreign material width with the maximum width wmax. If the foreign material width w is less than or equal to the maximum width wmax in all foreign material image groups, the CPU 321 proceeds to step S909. In step S909, the CPU 321 performs foreign material correction setting. For example, the CPU 321 passes the position information of all foreign materials to the foreign material correction unit 327, to enable the foreign material correction unit 327 to execute the foreign material correction process. In step S910, the CPU 321 determines the reading position candidate with foreign material images correctable by the foreign material correction unit 327, as the sheet reading position. The foreign material detection process is thus terminated when foreign material images correctable by the foreign material correction unit 327 are detected, with it being possible to reduce the wait time to start reading.

On the other hand, if the current number n of foreign materials exceeds the maximum number nmax in step S907 or the width w of foreign material images exceeds the maximum width wmax in step S908, the CPU 321 proceeds to step S911. In step S911, the CPU 321 determines whether or not the currently counted number of times the detection has been performed exceeds the upper limit number N. If the counted number of times exceeds the upper limit number N, the CPU 321 proceeds to step S913. In step S913, the CPU 321 determines a reading position candidate with fewest foreign material images from among a plurality of reading position candidates for which the detection process has been completed, as the sheet reading position. Here, the numbers of foreign materials of the plurality of reading position candidates for which the detection process has been completed are read from the RAM 323 and compared with each other. The CPU 321 controls the motor M1 to move the scanner unit 209 to the sheet reading position. The CPU 321 stores the position information of the sheet reading position in the backup storage unit 330, and ends the quick foreign material avoidance control.

If the counted number of times does not exceed the upper limit number N, on the other hand, the CPU 321 proceeds to step S912. In step S912, the CPU 321 controls the motor M1 to move the scanner unit 209 to the next reading position candidate, and returns to step S903. In step S903, the CPU 321 starts the foreign material detection for the next candidate. The subsequent process is as described above.

The detection process is thus performed within the upper limit number N of times that depends on the conveyance path length L, instead of performing the foreign material detection on all of the Na reading position candidates. The wait time can be reduced in this way. Therefore, in the flow-reading mode executed immediately after return from the sleep mode, the wait time can be reduced while reducing foreign material images.

After the subroutine of the quick foreign material avoidance control shown in FIG. 9 ends, the CPU 321 proceeds to step S808 in the flowchart in FIG. 8. In step S808, the CPU 321 controls the motors M3 and M4 to convey the sheet S to the sheet reading position, and causes the image sensor unit 210 to read the sheet. In step S809, the CPU 321 determines whether or not the job ends, based on the detection result of the sheet sensor 16. When the sheet sensor 16 no longer detects any sheet S, the CPU 321 determines that all sheets have been read. Having read all sheets, the CPU 321 proceeds to step S810.

In step S810, the CPU 321 performs the normal foreign material avoidance control. The normal foreign material avoidance control is as described with reference to FIG. 7. In the normal foreign material avoidance control, the foreign material detection is performed on all of the Na reading position candidates, and a candidate with fewest foreign material images is determined as the sheet reading position. The position information of the sheet reading position determined in the normal foreign material avoidance control is stored in the backup storage unit 330, and selected with priority (i.e. selected first) in step S903 when the quick foreign material avoidance is performed next time. For example, in the case where the position information indicating P3 from among the reading positions P1 to P5 shown in FIG. 6B is stored in the backup storage unit 330, P3 is selected first. After this, the reading position candidates are selected in the order of, for example, P4, P5, P1, and P2.

In this embodiment, in the case where the foreign material detection unit 324 cannot complete the detection process for all of the predetermined number of reading position candidates before the sheet S arrives at the predetermined position (the conveyance roller 4) in the conveyance path, the reading position determination unit 328 performs the quick foreign material avoidance control. In detail, the reading position determination unit 328 determines a reading position candidate with fewest foreign material images from among a plurality of reading position candidates for which the detection process by the foreign material detection unit 324 has been completed, as the sheet reading position. In this embodiment, the foreign material detection process is thus performed only on part of the reading position candidates, so that the time required for the foreign material detection process and the position determination process can be reduced as compared with the normal foreign material avoidance.

In the case where the foreign material detection unit 324 can complete the detection process for all of the reading position candidates, the reading position determination unit 328 may perform the normal foreign material avoidance control. In detail, the reading position determination unit 328 may determine a reading position candidate with fewest foreign material images from among the predetermined number of reading position candidates, as the sheet reading position.

In either of the normal foreign material avoidance control or the quick foreign material avoidance control, when a reading position candidate in which no foreign material image is detected by the foreign material detection unit 324 is found, the reading position determination unit 328 may determine the reading position candidate as the sheet reading position and terminate the position determination process. The reading position candidate in which no foreign material adheres is obviously the reading position candidate with fewest foreign material images from among all reading position candidates. Moreover, power can be saved by omitting any unnecessary process.

In the quick foreign material avoidance control, the reading position determination unit 328 determines whether or not the count in the counter reaches the upper limit number without the reading position candidate in which no foreign material image is detected being found (step S911). When the count reaches the upper limit number, the reading position determination unit 328 terminates the position determination process and determines, as the sheet reading position, a reading position candidate with fewest foreign material images from among a plurality of reading position candidates for which the foreign material detection unit 324 has completed the foreign material detection. The time required for the sheet S to move from the resist roller 3 to the conveyance roller 4 corresponds to the upper limit number. Hence, the reading position determination unit 328 may monitor the time or monitor the number of times the detection process has been performed. In the case where the conveyance velocity is higher in the monochrome reading mode than in the multicolor reading mode as the document reading mode, the upper limit number is smaller in the monochrome reading mode than in the multicolor reading mode. Since the conveyance velocity is higher in the monochrome reading mode than in the multicolor reading mode, there is not enough time in the monochrome reading mode as compared with the multicolor reading mode. Accordingly, the upper limit number is smaller in the monochrome reading mode than in the multicolor reading mode. The conveyance velocity may be determined depending on the resolution. That is, the upper limit number may be determined in proportion to the resolution. When the reading resolution is higher, the conveyance velocity is lower, and more time is available.

When no foreign material image is detected, the reading position determination unit 328 determines a reading position candidate in which no foreign material image is detected, as the sheet reading position (steps S706, S910). When a foreign material image is detected, the reading position determination unit 328 causes the motor M1 to move the scanner unit 209 to the next reading position candidate (steps S708, S912). The reading position determination unit 328 then causes the image sensor unit 210 to obtain a result of reading one main scanning line, and causes the foreign material detection unit 324 to perform the detection process on the next reading position candidate (steps S701, S903). Thus, when a foreign material image is detected, the foreign material detection process is repeated with the different reading position candidate.

When the number of foreign material images is less than or equal to the maximum number, the reading position determination unit 328 may terminate the position determination process and determine, as the sheet reading position, a reading position candidate in which the number of foreign material images is less than or equal to the maximum number (steps S907, S910). In this way, the foreign material detection process and the position determination process end early, and power can be saved. In addition, the effect of correction by the foreign material correction unit 327 can be expected when the number of foreign material images is less than or equal to the maximum number.

When the number of foreign material images is less than or equal to the maximum number and the foreign material width is less than or equal to the maximum width correctable by the correction unit, the reading position determination unit 328 may terminate the position determination process (steps S907, S908). In this case, the reading position determination unit 328 determines a reading position candidate in which the number of foreign material images is less than or equal to the maximum number and the foreign material width is less than or equal to the maximum width, as the sheet reading position (step S910). The number of foreign material images or the foreign material width that can be corrected differs depending on the algorithm employed by the foreign material correction unit 327. Accordingly, the condition for terminating the position determination process may be changed depending on the performance of the foreign material correction unit 327.

The CPU 321 in this embodiment functions as a selection unit for selecting the quick foreign material avoidance control when there is not enough time and selecting the normal foreign material avoidance control immediately after the sheet S reading job is completed. In other words, the quick foreign material avoidance control or the normal foreign material avoidance control is selected depending on whether or not the foreign material detection unit 324 can complete the detection process for all reading position candidates before the sheet S arrives at the predetermined position in the conveyance path. Examples of when there is not enough time include: immediately after the image reading apparatus starts receiving power from the power source; and immediately after the image reading apparatus returns from the power saving mode.

The backup storage unit 330 functions as a storage unit for storing position information indicating a reading position candidate determined as the sheet reading position in the normal foreign material avoidance control (first mode) (step S709). When the CPU 321 selects the quick foreign material avoidance control (second mode), the foreign material detection unit 324 can start the detection process from the reading position candidate indicated by the position information stored in the backup storage unit 330 (step S903). If the time elapsed from the execution of the normal foreign material avoidance control is short, the possibility that a foreign material newly adheres to the platen is low. Therefore, by starting the quick foreign material avoidance control from the reading position candidate determined to have few foreign materials in the normal foreign material avoidance control, a reading position with few foreign materials can be found early.

Figure 11A:
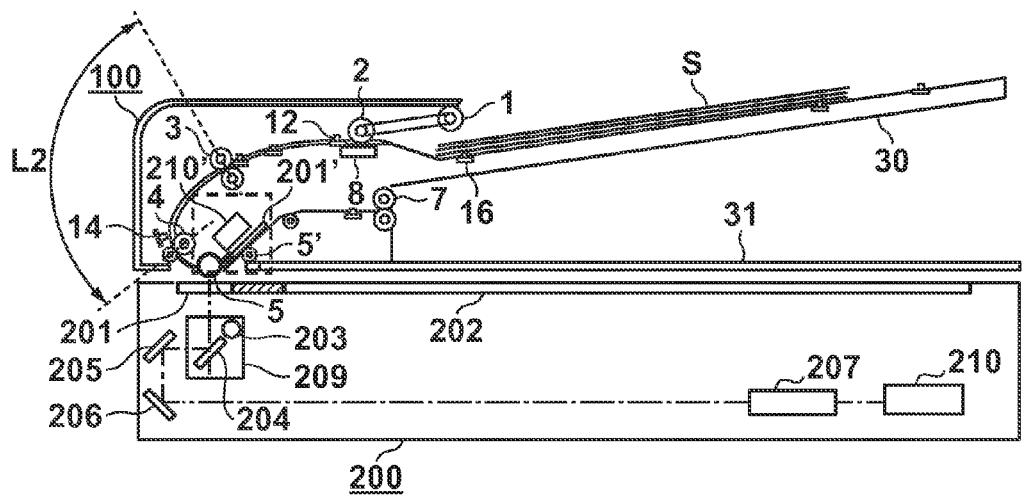
FIGS. 11A and 11B are sectional views of an image reading apparatus.

In the image reading apparatus shown in FIG. 1A, the image sensor unit 210 reads the first and second surfaces of the sheet. Alternatively, the ADF 100 may include an image sensor unit 210' for reading the second surface of the sheet S, as shown in FIG. 11A. The present invention is equally applicable to an image reading apparatus in which the ADF 100 includes the image sensor unit 210'. The parts described above have been given the same reference signs, and their description is omitted.

Figure 11B:
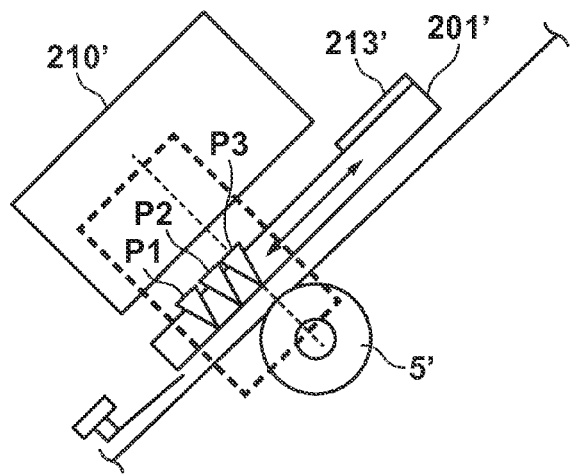

As shown in FIG. 11B, a platen roller 5' is located opposite to the image sensor unit 210'. A platen 201' is located between the image sensor unit 210' and the platen roller 5'. The platen 201' is movable in the arrow direction shown in FIG. 11B. Moving the platen 201' enables the image sensor unit 210' to avoid any foreign material adhering to the platen 201'. The platen 201' has a plurality of reading position candidates P1 to P3. For example, the reading position candidate P3 with fewest foreign material images from among the plurality of reading position candidates P1 to P3 is determined as the sheet reading position. A white reference member 213' for shading correction is provided on the platen 201'. Moving the platen 201' enables the image sensor unit 210' to read the white reference member 213'.

Figure 12:
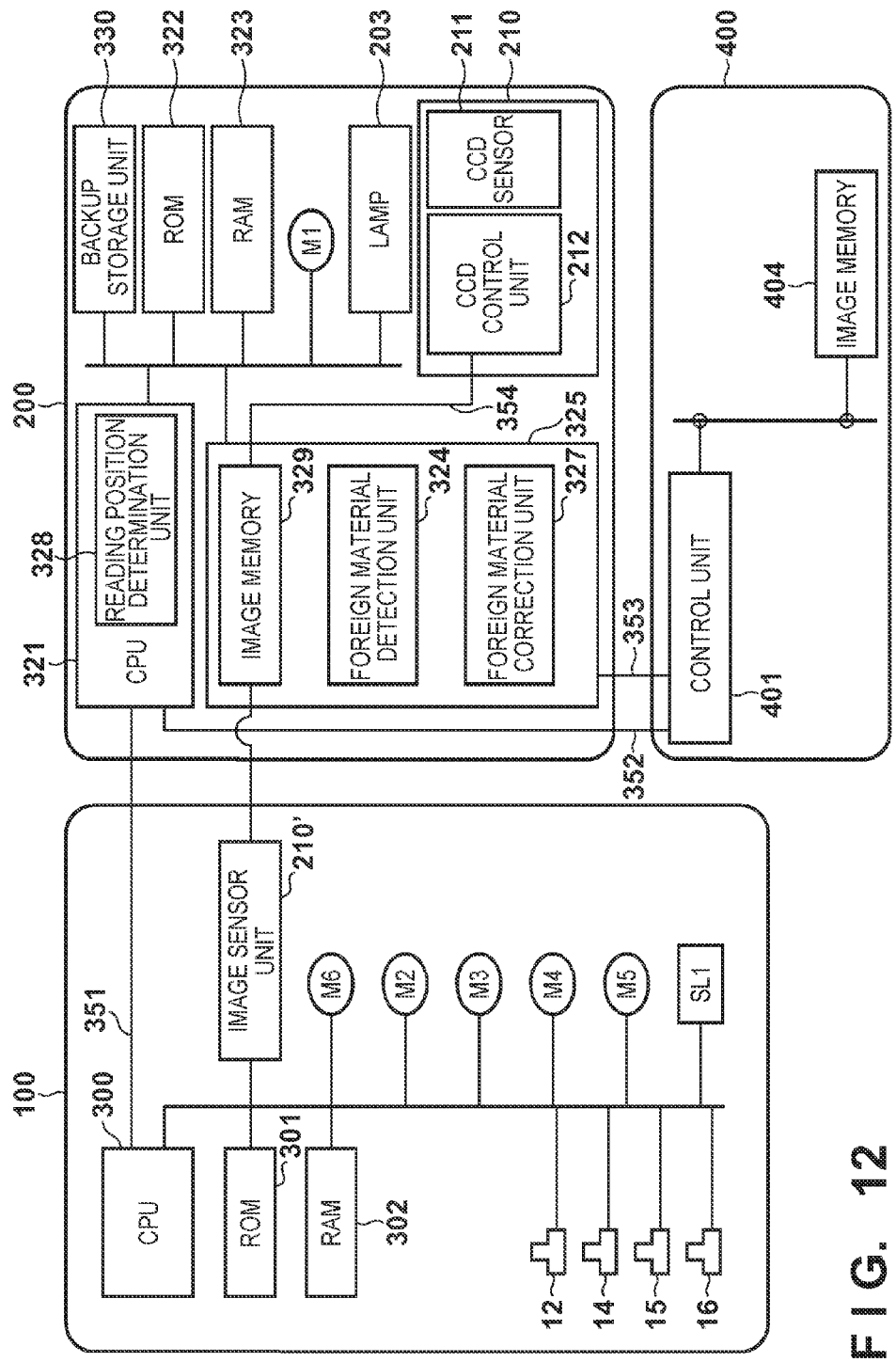
FIG. 12 is a diagram showing a control unit.

FIG. 12 shows an example of a control unit. When instructed to read the second surface by the CPU 321, the CPU 300 activates the image sensor unit 210'. The internal structure and process of the image sensor unit 210' are basically the same as those of the image sensor unit 210. The CPU 321 (the reading position determination unit 328) causes the CPU 300 to drive a motor M6, to move the platen 201' to a first reading position candidate. The motor M6 functions as a moving unit for moving the platen 201' to change the reading position of the image sensor unit 210' with respect to the platen. The position information of the first reading position candidate is stored in the backup storage unit 330. The CPU 300 drives the motor M6 according to the position information designated by the CPU 321, to move the platen 201' to the first reading position candidate. The normal foreign material avoidance control and the quick foreign material avoidance control relating to the image sensor unit 210' may be basically the same as those relating to the image sensor unit 210 for the first surface.

In the normal foreign material avoidance control, the foreign material detection is performed on all reading position candidates in the platen 201', as shown in FIG. 7 (steps S701 to S709). As a result, the reading position determination unit 328 determines a reading position candidate with fewest foreign materials (e.g. a reading position candidate with no foreign material), as the sheet reading position. The position information of the sheet reading position is stored in the backup storage unit 330. In the quick foreign material avoidance control, the foreign material detection is performed on part of the plurality of reading position candidates in the platen 201', as shown in FIGS. 8 and 9.

The drive source of the platen roller 5' for the second surface is the same as the drive source of the platen roller 5 for the first surface, i.e. the motor M4. When the platen roller 5' is rotated for foreign material detection, the conveyance roller 4 and the platen roller 5 rotate, too. Accordingly, the foreign material detection and the reading position determination need to be completed in the period from when the leading edge of the sheet S starts from the resist roller 3 to when the leading edge of the sheet S arrives at the conveyance roller 4. This prevents the wait time to start reading the sheet S from being extended due to the foreign material detection and the reading position determination.

As shown in FIG. 11A, let L2 be the conveyance path length from the resist roller 3 to the conveyance roller 4. Let N2 be the upper limit number of times the foreign material detection can be performed in the period during which the sheet S is conveyed from the resist roller 3 to the conveyance roller 4. Let Tg2 be the time taken for the foreign material detection unit 324 to perform the foreign material detection process once. Let V be the conveyance velocity of the sheet S, which may differ depending on the control mode.

$$N2=L2/V/Tg2.$$

In this embodiment, the relation N2<Na2 is assumed to hold true, where Na2 is the total number of reading position candidates in the platen 201'. This is because the normal foreign material avoidance control is always possible in an image reading apparatus in which N2≥Na2. In step S902, N2 is determined in this way. The upper limit number N2 may be determined using the equation, or the predetermined upper limit number N2 may be read from the ROM 322 and determined.

Thus, the present invention is equally applicable to the image reading apparatus that includes the image sensor unit 210' for the second surface separately from the image sensor unit 210 for the first surface. Such a reading position candidate that reduces the influence of foreign material images on the read image can be determined as the sheet reading position, without increasing the wait time for reading. If a reading position candidate with no foreign material is found within the predetermined time required for the sheet S to travel from the resist roller 3 to the conveyance roller 4, the candidate is determined as the sheet reading position (step S910). If a reading position candidate in which the number of foreign materials or the foreign material width is correctable by the foreign material correction unit 327 is found within the predetermined time, the candidate is determined as the sheet reading position (steps S907 to S909). Alternatively, a reading position candidate with fewest foreign materials from among the reading position candidates that have undergone the detection within the predetermined time is determined as the sheet reading position (step S913).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172664, filed Aug. 22, 2013 which is hereby incorporated by reference herein in its entirety.

What is claimed is:

1. An image reading apparatus comprising:
a conveyance unit configured to convey a sheet;
a reading unit configured to read, in a reading position, the sheet being conveyed by the conveyance unit, based on a set reading mode, the reading mode including a first reading mode and a second reading mode different from the first reading mode;
a foreign material detection unit configured to detect a position of a foreign material in the reading position, based on image data output from the reading unit while the sheet is not conveyed to the reading position;
a moving unit configured to move the reading unit, to change the reading position;
a number determination unit configured to determine a number of performing a detection process of causing the moving unit to change the reading position and of causing the foreign material detection unit to detect the position of the foreign material, before the reading unit starts reading the sheet, based on the set reading mode;
a counting unit configured to count a number of times the foreign material detection unit has completed the detection process; and
a position determination unit configured to determine the reading position for reading the sheet based on a foreign material detection result of the foreign material detection unit by causing the detection process to be performed less than or equal to the number determined by the number determination unit before the reading unit starts reading the sheet,
wherein the number of performing the detection process based on the first reading mode is set to be different from the number of performing the detection process based on the second reading mode,
wherein when a reading position candidate is found in which no foreign material image is detected by the foreign material detection unit, the position determination unit determines the reading position candidate as the reading position for reading the sheet, and terminates a position determination process, and
wherein when the number counted by the counting unit reaches an upper limit number without finding a reading position candidate in which no foreign material image is detected, the position determination unit terminates the position determination process and determines, as the reading position for reading the sheet, a reading position candidate with fewest foreign material images from among a plurality of reading position candidates for which the foreign material detection unit has completed the detection process.

2. The image reading apparatus according to claim 1, wherein the reading mode includes a first reading mode and a second reading mode that differ in a conveyance velocity of the sheet.

3. The image reading apparatus according to claim 1, wherein the conveyance unit includes:
a first conveyance unit;
a second conveyance unit located downstream of the first conveyance unit in a conveyance path, and driven independently of the first conveyance unit; and
a third conveyance unit located downstream of the second conveyance unit in the conveyance path, and driven together with the second conveyance unit,
wherein the position determination unit is further configured to terminate the position determination process and determine the reading position for reading the sheet, before the sheet arrives at the second conveyance unit.

4. The image reading apparatus according to claim 3, wherein the number determination unit includes:
an upper limit number determination unit configured to determine the upper limit number by which the foreign material detection unit performs the detection process, from a conveyance path length from the first conveyance unit to the second conveyance unit, a conveyance velocity of the sheet, and a detection process time of the foreign material detection unit required for one reading position candidate.

5. The image reading apparatus according to claim 4, wherein the upper limit number in a monochrome reading mode is smaller than the upper limit number in a multicolor reading mode.

6. The image reading apparatus according to claim 1, wherein the position determination unit is further configured to:
determine, when no foreign material image is detected, a reading position candidate in which no foreign material image is detected, as the reading position for reading the sheet; and
cause, when a foreign material image is detected, the moving unit to move the reading unit to a next reading position candidate, cause the reading unit to obtain a result of reading one main scanning line, and cause the foreign material detection unit to perform the detection process on the next reading position candidate.

7. The image reading apparatus according to claim 1, further comprising:
a correction unit configured to correct a foreign material image in an image read from the sheet;
a number counting unit configured to count the number of foreign material images detected by the foreign material detection unit from a result of reading one main scanning line; and
a determination unit configured to determine whether or not the number of foreign material images is less than or equal to a maximum number of foreign material images correctable by the correction unit,
wherein, when the number of foreign material images is less than or equal to the maximum number, the position determination unit terminates the position determination process and determines, as the reading position for reading the sheet, a reading position candidate in which the number of foreign material images is less than or equal to the maximum number.

8. The image reading apparatus according to claim 7, further comprising a foreign material width counting unit configured to count a foreign material width which is the number of foreign material images detected by the foreign material detection unit from the result of reading the main scanning line and is the number of successive foreign material images in a main scanning direction,
wherein, when the number of foreign material images is less than or equal to the maximum number and the foreign material width is less than or equal to a maximum width correctable by the correction unit, the position determination unit terminates the position determination process and determines, as the reading position for reading the sheet, a reading position candidate in which the number of foreign material images is less than or equal to the maximum number and the foreign material width is less than or equal to the maximum width.

9. The image reading apparatus according to claim 1, further comprising a selection unit configured to select one of a first mode in which all of a predetermined number of reading position candidates are subject to the detection process and a second mode in which part of the predetermined number of reading position candidates are subject to the detection process,
wherein the selection unit is further configured to:
select the second mode, immediately after the image reading apparatus starts receiving power from a power source or immediately after the image reading apparatus returns from a power saving mode; and
select the first mode, immediately after a job of reading the sheet is completed.

10. The image reading apparatus according to claim 9, further comprising a storage unit configured to store position information indicating a reading position candidate determined as the reading position for reading the sheet in the first mode,
wherein, when the selection unit selects the second mode, the foreign material detection unit starts the detection process from the reading position candidate indicated by the position information stored in the storage unit.

11. The image reading apparatus according to claim 1, wherein the reading unit is a reading unit for reading a first surface of the sheet.

12. The image reading apparatus according to claim 1, wherein the reading unit is a reading unit for reading a second surface of the sheet.

13. An image reading apparatus comprising:
a platen unit;
a conveyance unit configured to convey a sheet on the platen unit;
a reading unit configured to read, in a reading position and via the platen unit, the sheet being conveyed by the conveyance unit, based on a set reading mode, the reading mode including a first reading mode and a second reading mode different from the first reading mode;
a foreign material detection unit configured to detect a position of a foreign material in the reading position, based on image data output from the reading unit while the sheet is not conveyed to the reading position;
a moving unit configured to move the platen unit, to change the reading position;
a number determination unit configured to determine a number of times of performing a detection process of causing the moving unit to move the platen unit and of causing the foreign material detection unit to detect the position of the foreign material, before the reading unit starts reading the sheet, based on the set reading mode;
a counting unit configured to count a number of times the foreign material detection unit has completed the detection process; and
a position determination unit configure to determine the reading position for reading the sheet based on a foreign material detection result of the foreign material detection unit by causing the detection process to be performed less than or equal to the number of times determined by the number determination unit before the reading unit starts reading the sheet, wherein the number of performing the detection process based on the first reading mode is set to be different from the number of performing the detection process based on the second reading mode, wherein when a reading position candidate is found in which no foreign material image is detected by the foreign material detection unit, the position determination unit determines the reading position candidate as the reading position for reading the sheet, and terminates a position determination process, and wherein when the number counted by the counting unit reaches an upper limit number without finding a reading position candidate in which no foreign material image is detected, the position determination unit terminates the position determination process and determines, as the reading position for reading the sheet, a reading position candidate with fewest foreign material images from among a plurality of reading position candidates for which the foreign material detection unit has completed the detection process.

* * * * *